H. M. TOMPKINS.
UNIT FOR MOTOR VEHICLE CONSTRUCTION.
APPLICATION FILED FEB. 6, 1917.
1,304,121.  Patented May 20, 1919.
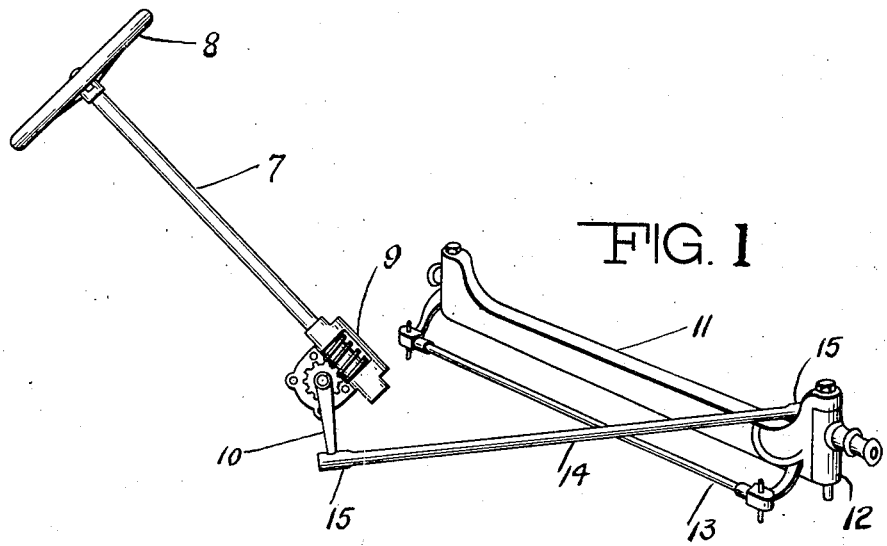
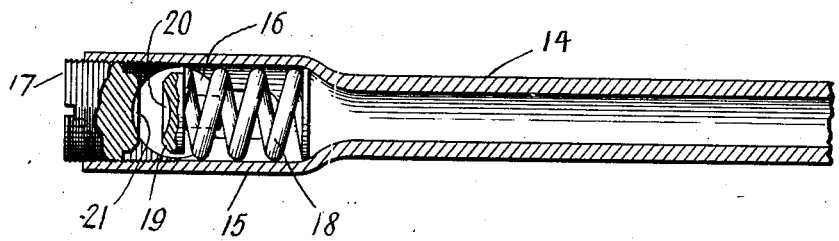
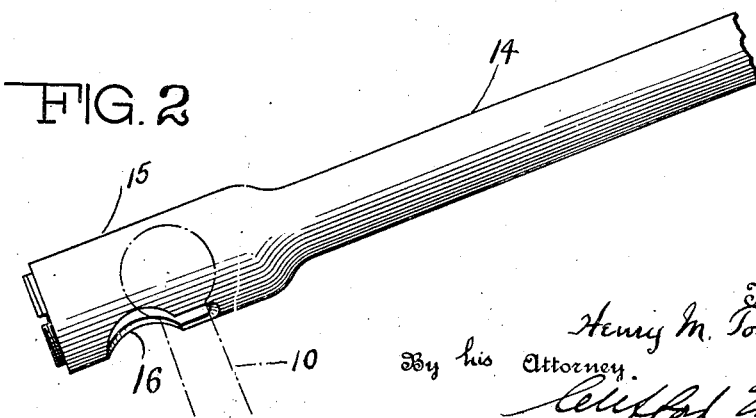

UNITED STATES PATENT OFFICE.

HENRY M. TOMPKINS, OF DETROIT, MICHIGAN.

UNIT FOR MOTOR-VEHICLE CONSTRUCTION.

1,304,121.   Specification of Letters Patent.   Patented May 20, 1919.

Application filed February 6, 1917. Serial No. 146,885.

*To all whom it may concern:*

Be it known that I, HENRY M. TOMPKINS, a citizen of the United States, residing in Detroit, in the county of Wayne and State of Michigan, have invented certain new and useful Improvements in Units for Motor-Vehicle Construction, of which the following, taken in connection with the accompanying sheet of drawings, is a full, clear, and concise description.

The present invention relates generally to improvements in motor vehicle construction, and is more especially directed to improvements in the manufacture of particular components thereof, such as drag links, reach rods, torque arms and similar parts.

As is well known it has heretofore been the practice to form drag links, reach rods, torque arms and similar members of the motor vehicle construction of metal tubing, the enlarged ends required for attaching these members being made of tubing of a greater cross-sectional area than that of which the body portion of the member is composed.

The employment of the large tubing made it necessary to submit the same to a compressing or swaging operation to reduce one end thereof to the diameter of the tubing employed in the body portion of the member, after which the attaching end was welded to the body portion of the member. This construction has been found to possess numerous disadvantages by reason of the fact that in manufacturing, these attaching ends or sockets split or break. Furthermore, and the paramount objection to this construction is that it is inherently weak as it has been found that in a large majority of the motor vehicle accidents which may be attributed to failure of the steering gear, the drag link has invariably been found to have been broken where the socket has been joined or welded to the body portion of the member.

The primary object of the present invention is to effectually overcome the aforesaid disadvantages of use of the types of members described, in an economical and simple manner by constructing or forming the various members, such as drag links, reach rods, torque arms and the like of seamless metal tubing, whereby the attaching or socket portion of the member will be an integral part of the member.

A further object of my present invention is to form or construct a drag link, reach rod, torque arm or the like which will possess great strength and durability, by reason of the fact that in practising my invention I do not subject the metal of which the members produced by me are made, to undue strains in the forming process, pressure being applied thereto in what may be termed the grain or direction of run of the metal to produce the attaching ends or sockets.

My invention further contemplates the production of members of motor vehicle construction as heretofore set forth, wherein the attaching ends or sockets which are larger than the body portions of the member are formed by an expanding process, so that the member is an integral piece, and all necessity for welding or brazing with its inherent defects is eliminated.

Other objects and advantages of my invention will become manifest as I proceed with the description thereof, and I would have it clearly understood that I do not limit myself in any patricular to the specific uses herein set forth, since it is obvious that my invention may be employed in the production of parts other than those enumerated, not only for the components of motor vehicle structures but for other mechanical structures as well.

In order to render a clear and comprehensive understanding of my invention, I shall describe the same with reference to the construction or formation of a drag link, such as is incorporated in the steering mechanism of motor vehicle construction, one embodiment of my invention of this type being illustrated or shown in the drawings.

It will be readily apparent to one skilled in the art that the practising of my invention in the production of a drag link may be advantageously carried out in the manufacture of reach rods, torque arms and other parts where metal tubing is now used, and the attaching or socket ends are formed separately from the body portions thereof.

I shall now proceed to describe my invention with reference to the accompanying drawings which as before stated illustrate a specific adaptation thereof for the purpose of this description, and then proceed to point out with some particularity the essential elements of novelty thereof in the appended claims.

In the accompanying drawings:

Figure 1 is a diagrammatic view of the steering mechanism of a motor vehicle, showing a drag link incorporated therein made in accordance with my invention.

Fig. 2 is an enlarged view of a portion of the drag link shown in Fig. 1, and

Fig. 3 is a longitudinal section of the structure shown in Fig. 2, showing the differences in diameter brought out by the expanding process to be exaggerated.

Referring now to the drawings in detail in which like characters are employed to designate similar parts throughout the several views:

7 indicates the steering post of a motor vehicle having the usual steering wheel 8 at one end and the worm gearing 9 at its opposite end for imparting an oscillatory movement to the arm or lever 10 upon the rotation of the steering wheel 8.

11 represents the front axle of the vehicle within which the steering knuckle 12 is supported in the well known manner, the steering knuckles on the opposite ends of the axle being connected by the tie bar 13, so as to function in unison. The drag link 14 is connected to one of the steering knuckles 12 and to the oscillating arm or lever 10, so that as the latter is rocked by the functioning of the worm gearing, movement is imparted to the drag link in a longitudinal direction, and the steering knuckle rotates on its fulcrum.

The drag link 14 consists of a body portion and the enlarged end portions or socket members 15 which are apertured as shown at 16 for the reception of the means for connection between the drag link and its cooperating parts of the steering mechanism. The interior of the sockets adjacent to the ends thereof are preferably threaded to receive the cap 17, and yielding medium, such as a spring 18 being contained therewithin and carrying a support 19 formed with a bearing surface 20 similar to the bearing surface 21 on the inner end of the cap 17. This construction, of course, is well known to those skilled in the art to which this invention appertains and the functioning of these parts and the means of connection therebetween and the parts of the steering mechanism for actuating the drag link and the parts actuated thereby need not be described.

In the production of the drag link 14, I have found it expedient to make the same of seamless metal tubing as heretofore pointed out. To this end I employ tubing of the diameter, strength and thickness which are required to be embodied in the body or main portion of the drag link and instead of constructing or forming the attaching ends or sockets separately, and then brazing or welding the same to the main tubing, I subject the tubing in my drag link, adjacent to the ends thereof to an expanding or drawing process, whereby the enlarged ends or socket members 15 are produced as an integral part of the drag link.

It is obvious that by drawing or expanding the metal tubing instead of compressing it as has heretofore been done, I obtain a much more serviceable and durable member, by reason of the fact that in the drawing or stretching operation the thickness of the wall of the tubing retains a greater degree of uniformity where it has been operated upon than can be obtained by a swaging process. This may be attributed to the fact that the swaging process serves to produce a more or less sharp bend on the interior wall of the tubing which readily makes it liable to fracture or breakage, whereas, in the expanding or drawing method, which I follow in the practice of my invention, the possibility or likelihood of fracture from this cause is practically eliminated by reason of the fact that the metal is gradually stretched or expanded in the direction of its grain or run.

As before stated, my invention is susceptible to employment in the production of various components of motor vehicle construction wherever tubular parts similar to those described are employed, and I would have it understood that I do not in any way limit myself to the disclosure or details of structure herein set forth reserving unto myself the full range of equivalents in use and structure to which I am entitled under my invention in its broadest aspect.

Having thus described my invention, what I claim as new herein and desire to secure by Letters Patent is:—

1. As a new article of manufacture, a tubular unit for motor vehicle construction made from a seamless drawn metal tube and having an enlarged socket-like end, said end being formed by expanding the walls of the tube to a larger diameter, whereby the metal is deformed along the grain thereof, and the socket and the tube have substantially the same strength as the portion intermediate them.

2. As a new article of manufacture, a metalic tubular unit for motor vehicle construction, said unit having a plurality of both internal and external diameters obtained by expanding the metal, whereby overstraining the metal in shear is avoided, and the strength of one transverse section is substantially the same as that of another.

3. In a motor vehicle, in combination, a driving part, a driven part and a means therebetween for operating the latter from the former, said means comprising a tubular link of drawn and expanded metal, said link having a plurality of both internal and external diameters.

HENRY M. TOMPKINS.